United States Patent
Taketsuna et al.

(10) Patent No.: US 7,029,418 B2
(45) Date of Patent: Apr. 18, 2006

(54) TOROIDAL TYPE CONTINUOULSY VARIABLE TRANSMISSION

(75) Inventors: Yasuji Taketsuna, Okazaki (JP); Shigenori Tamaki, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 472 days.

(21) Appl. No.: 10/451,277

(22) PCT Filed: Dec. 21, 2001

(86) PCT No.: PCT/JP01/11262

§ 371 (c)(1),
(2), (4) Date: Jun. 23, 2003

(87) PCT Pub. No.: WO02/053948

PCT Pub. Date: Jul. 11, 2002

(65) Prior Publication Data

US 2004/0067816 A1 Apr. 8, 2004

(30) Foreign Application Priority Data

Dec. 28, 2000 (JP) ............................ 2000-402233

(51) Int. Cl.
*H02P 15/00* (2006.01)
(52) U.S. Cl. .............. 476/8; 476/40; 476/42
(58) Field of Classification Search ............ 476/8, 476/40, 42
See application file for complete search history.

(56) References Cited

U.S. PATENT DOCUMENTS 5,993,349 A * 11/1999 Sugihara ................ 476/8

2002/0049113 A1* 4/2002 Watanabe et al. ............ 476/8
2005/0064985 A1* 3/2005 Imanishi et al. ............ 476/8

FOREIGN PATENT DOCUMENTS

| JP | U 63-11065 | 7/1988 |
|---|---|---|
| JP | U 63-110765 | 7/1988 |
| JP | U 2-47458 | 3/1990 |
| JP | A 2-261950 | 10/1990 |
| JP | A 2-275168 | 11/1990 |
| JP | A 6-74317 | 3/1994 |
| JP | A 8-291850 | 11/1996 |
| JP | A 10-103440 | 4/1998 |
| JP | A 10-141480 | 5/1998 |
| JP | A 11-51141 | 2/1999 |
| JP | A 11-280876 | 10/1999 |
| JP | A 2000-234669 | 8/2000 |
| JP | A 2001-304365 | 10/2001 |

* cited by examiner

*Primary Examiner*—David Fenstermacher
(74) *Attorney, Agent, or Firm*—Oliff & Berridge, PLC

(57) ABSTRACT

A toroidai type continuously variable transmission wherein a rolling member is clamped between rotary members; and wherein a rolling face of rotary members being opposed to each other has a curved face, in which its sectional face along the plane including a center axis of rotation is shaped into an arc, in order to allow said rolling face of said rolling member inclining against the center axis of the rotation of said rotary member, characterized by: an oiling hole formed on the portion on the center side of the rotation in said rolling face of the rotary members being opposed to each other, or on the portion on the center side of the rotation leading to said rolling face; and the oil passage for feeding the lubricating oil to the oiling hole, formed on the center side of the rotation in said rotary member, with being communicated with the oiling hole.

11 Claims, 3 Drawing Sheets

TOROIDAL TYPE CONTINUOULSY VARIABLE TRANSMISSION

TECHNICAL FIELD

This invention relates to a toroidal type (or traction type) continuously variable transmission which is constructed to vary the gear ratio continuously, with clamping a rolling member between a pair of rotary members to transmit a torque to one of the rotary members through the rolling member by rotating the other rotary member, and by varying the torque transmitting point between the rolling member and the rotary member in the radial direction.

BACKGROUND ART

A continuously variable transmission of this kind is constructed with, e.g., clamping a disc-shaped roller between a pair of discs arranged opposed to each other. The portions of the pair of discs where is the outer side from a predetermined radius has an arcuate plane congruent with the arc centered on the center point of those opposed planes of those discs, and such arcuate plane is leading to circumferential direction. The plane thus incurved three-dimensionally is a toroidal plane. The toroidal planes functions as a rolling face and the roller is clamped therebetween. The roller is disc-shaped member and its sectional figure along the in-depth direction of the outer circumferential portion is congruent with the arcuate figure of the rolling face of the discs. Accordingly, the roller is rotated by means of rotating one of the discs, and the other disc rotates sequentially. Then, the roller is inclined to move the radial position of the contact portion against one of the discs, i.e., the radial position from the center axis of the disc outward, and also to move the radial position of the contact portion against the other disc to inner circumferential side, so that the gear ratio corresponding to the proportion of the radii of each contact portions is accordingly set.

Transmission of the torque in this toroidal type continuously variable transmission is executed according to the load (pressure) to thrust the disc and the power roller; therefore, bigger torque is transmitted, bigger clamping force to clamp the power roller becomes, and the amount of the heat generated between the disc and the power roller becomes larger in consequence. Surface hardening treatment is provided on the surface of the disc in order to bear a big clamping force. However, the condition similar with the tempering is generated when the surface temperature of the disc is risen by the heat evolution arises from the transmission of the torque. As a result, abrasion, separation or the like is occurred on the toroidal face of the disc in connection with degrading of the hardness of the disc surface, and its durability is thereby deteriorated. Also, in general, transmission of the torque between the disc and the power roller is executed by the shearing force generated therebetween without contacting those directly. However, as mentioned above, viscosity of the oil film is deteriorated when the temperature rises, and as a result, slippage could occur and there is a possibility to cause a faulty transmission of the torque.

Accordingly, in the toroidal type continuously variable transmission, it is preferable to execute cooling aggressively on the portion where the transmission of the torque is generated, i.e., the surface of the disc or the like. A device for that purpose is disclosed in e.g., Japanese Patent Laid-Open 11-280876 heretofore. Taking generation of slippage due to decreasing of the traction force arise from the temperature rise of the traction drive portion as a contact portion between the disc and the roller into consideration, the device disclosed on this Laid-Open is constructed of; an oil reservoir portion provided on the end portion of inner circumference of the disc; and an oil passage formed on a post (protrusion) protruding from inner circumferential face of the casing to the center portion; in order to feed lubricating oil which is fed to the oil reservoir portion through the oil passage, to the toroidal face with defusing by means of centrifugal force that accompanies the rotation of the disc. With this construction, the lubricating oil spreads overall from the inner circumferential side of the toroidal face with flowing to the outer circumferential side, and the heat is drawn in the meantime. Accordingly, temperature rise of the disc is thereby suppressed or prevented.

However, if the oil reservoir portion as disclosed in the aforementioned Laid-Open is to be arranged with being faced on the inner circumferential end of the disc, the oil reservoir portion has to be arranged with being fixed on the outer circumference of the input shaft or the output shaft, because, in the toroidal type continuously variable transmission, an input shaft or an output shaft is arranged along the center axis of rotation of the discs with penetrating those. In order to construct such arrangement, the oil reservoir portion is to be held by some member leading from the inner face of the casing to the center portion. However, a fixing member has to be interposed between the rotary members and so that the structure becomes complicated, as a result, there is a possibility to make manufacturing and assembling difficult.

Also, the device disclosed in the aforementioned Laid-Open has to be structured with inserting inner circumference end portion of the disc from the both side of the oil reservoir portion in the axial direction, and the structure of the oil reservoir portion has to be so-called ring shaped with opening its both right and left side. Therefore, it is rather difficult to conserve the lubricating oil and it is necessary to flow a large amount of the lubricating oil continuously, in order to feed the lubricating oil sufficiently. In other words, to control the amount of the lubricating oil is rather difficult, and there are disadvantages such as unnecessary flow of large amount of the lubricating oil, and subsequent unnecessary waste of the motive energy. This invention has been conceived noting the aforementioned technical problem and has an object to provide a toroidal type continuously variable transmission which can feed the lubricating oil without excess and deficiency with simple structure, to the face where the transmission of the torque is generated, such as the toroidal plane.

DISCLOSURE OF THE INVENTION

In order to achieve the aforementioned object, the present invention is characterized by being constructed to feed lubricating oil to a rolling face of a rotary member where a rolling member for transmitting a torque is contacted therewith, from an oiling hole formed on the inner circumferential side of a rolling face of a rotary member. More specifically, according to the present invention, there is provided a toroidal type continuously variable transmission wherein the rolling member for mediating the transmission of the torque is clamped between at least a pair of rotary members; and wherein the rolling face of the rotary members being opposed to each other has a curved face, in which its sectional face along the plane including said center axis of rotation is shaped into an arc, in order to allow the rolling face of the rolling member inclining against the center axis of the rotation of the rotary member; characterized by: an oiling hole formed on the portion on the center side of the rotation in the rolling face of the rotary members being opposed to each other, or on the portion on the center side of the rotation leading to the rolling face; and the oil passage for feeding the lubricating oil to the oiling hole formed on center side of the rotation in the rotary member, with being communicated with the oiling hole.

According to the present invention, therefore, the lubricating oil is fed to the oiling hole from the oil passage arranged on the center side in the rotary member, and the lubricating oil is flown to the outer circumferential side of the rotary member by the centrifugal force generated from the rotation of the rotary member. Consequently, the rolling face of the rotary member where the transmission of the torque is generated is cooled by the lubricating oil. Additionally, the structure may be simplified according to the present invention, because it is sufficient for the oil passage of the center side of the rotary member to along the predetermined shaft in the axial direction, and to open to its end portion against the outer circumferential face of the shaft, and also, it is sufficient for the oiling hole to penetrate the end portion of the rotary member in the axial direction, and to be communicated with the oil passage. Moreover, said oil passage may be elongated to the outside of the member to rotate such as the rotary member or said predetermined shaft; therefore, the amount of the lubricating oil to be fed to the oil passage may be controlled easily with using the ordinary controlling devices such as a closing valve or a flow control valve.

Also, according to the present invention, said oiling hole may be formed in the portion of the rolling face where the rolling member is not contacted.

With this construction, the rolling member contacts with the portion of the rolling face where the oiling hole is not formed. Therefore, the oiling hole cannot be a factor of concavity and convexity on the rolling face in which the rolling member is to be contacted.

More specifically, the oiling hole is positioned near the center of rotation of the rolling face, or on a boss portion of the rotary member.

The present invention may further comprises; a temperature detector for detecting any of the temperature of the rolling face of the rotary member, or the rolling member; and a regulator for regulating amount of the oil to be fed from the oiling hole to the rolling face based on the temperature detected by the temperature detector.

The temperature detector is, e.g., a device for detecting the temperature of the rolling face directory, a device for detecting the temperature of the rolling face or the rolling member based on the temperature of the lubricating oil for lubricating the rolling face, a device for detecting the temperature based on the difference between the input energy and the output energy of the transmission, and so on.

With this construction, the lubricating oil is fed from the oiling hole in accordance with the temperature of the rotary member or the rolling member, and the rotary member is thereby cooled. Namely, because the amount of the lubricating oil is regulated in accordance with the temperature, the lubricating oil may be fed without excess and deficiency, and excessive rise of the temperature and unnecessary waste of the motive energy or the like is thereby prevented.

Moreover, the regulator may be constructed to increase the amount of the oil to be fed to the rolling face from the oiling hole in case of the temperature detected by the temperature detector excesses the criterion value which is set based on tempering temperature of the rotary member.

With this construction, the amount of the oil to be fed from the oiling hole is increased, when the temperature of the rolling face of the rotary member, or the temperature of rolling member excesses the criterion value which is set based on the tempering temperature of the rotary member. Therefore, the rolling face of the rotary member is cooled sufficiently, so that the tempering or sequential deterioration of the hardness is thereby avoided. Moreover, because the lubricating oil may not be fed excessively when the temperature is not especially high, unnecessary waste of the motive energy is avoided accordingly.

BEST MODE FOR CARRYING OUT THE INVENTION

Figure 4:
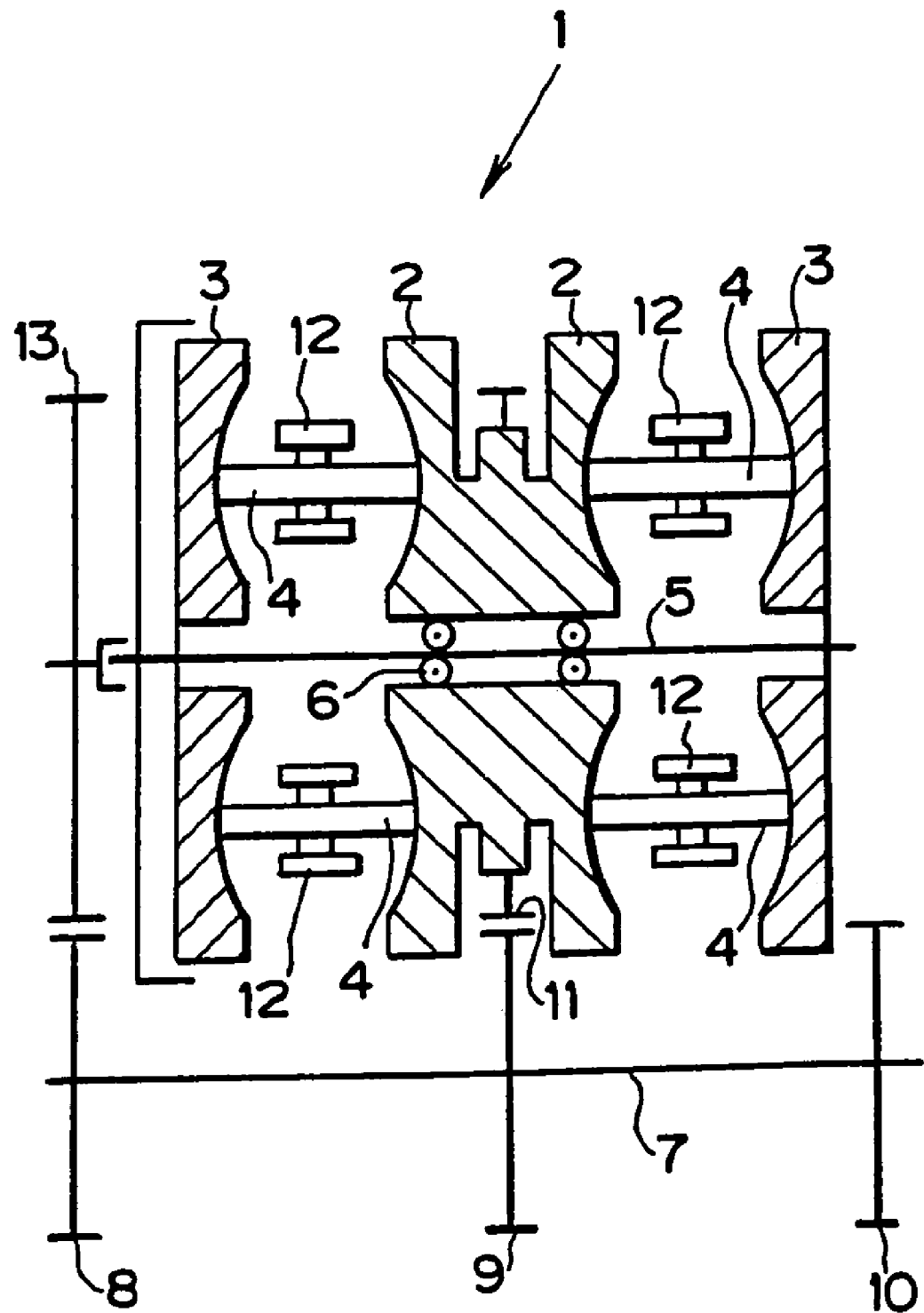
FIG. 4 is a typical sectional side view showing one example of an entire construction of a continuously variable transmission according to the present invention.

Next, the present invention will be described in connection with a specific embodiment with reference to the drawings. First of all, to describe one example of a continuously variable transmission subjected to the present invention, double cavity type full toroidal type continuously variable transmission 1 is depicted typically in FIG. 4. According to the toroidal type continuously variable transmission 1, a pair of input discs 2 is arranged in so-called back-to-back relation each other, and a pair of output discs 3 is arranged to be opposed to those input discs 2, namely, with sandwiching those input discs 2.

Those discs 2 and 3 are made such that portions of their opposed faces on an outer circumferential side from a predetermined radius are shaped, as cut in a plane on the center axis, to have a section of an arcuate plane of a predetermined radius, likewise the disc of the toroidal type continuously variable transmission according to the prior art. And a power roller (a rolling member) 4 corresponds to an idling member or a transmission member is clamped therebetween. That is, one of the output discs 3 is fixed in the axial direction, and a hydraulic chamber (not shown) is provided in the backside of another output disc 3 (opposite side of the rolling face). And the power roller 4 is clamped by each input disc 2 and the output disc 3 by means of feeding the oil pressure corresponds to the torque to be transmitted to the hydraulic chamber.

Here, each output disc 3 is connected with an output shaft 5 arranged along the center axis of those discs, and the output shaft 5 penetrates center portions of each input disc 2. And also, a bearing 6 is arranged between each input disc 2 and output shaft 5, in order to construct to allow those input disc 2 and output disc 5 rotate relatively.

Also, an input shaft 7 is arranged rotatably in parallel with the output shaft 5. The input shaft 7 is slightly longer than the entire length of the continuously variable transmission 1, and gears 8, 9, and 10 are installed on three places in total such as its both front and rear end portions, and its intermediate portion. The gear 9 of the intermediate portion is engaged with the gear 11, which is integrated with each input disc 2. Accordingly, the torque is inputted to the continuously variable transmission 1 from the input shaft 7 through those gears 9 and 11.

Moreover, said power roller 4 is a disc-shaped member, and the outer circumference of which has a sectional shape formed into curved face of a curvature equal to that of the arc of the rolling face of each discs 2 and 3. As the power roller 4 is inclined with respect to the individual discs 2 and 3, therefore, radial portions of the contact portions between the power roller 4 and the discs 2, 3 are arbitrarily changed. There are arranged three power rollers 4 in between each input disc 2 and output disc 3 at even intervals, and there are six of them are provided in total for the continuously variable transmission 1 as a whole.

Furthermore, each power roller. 4 is held rotatably and inclinably by the carriage 12 functioning as a holding member. A lubricating oil passage (not shown) for feeding the lubrication oil to the outer circumferential face of the power rollers 4 is formed in this carriage 12.

Besides, an input gear 13 engaged with the gear 8 installed on the input shaft 7 is provided, and the input gear 13 is rotated by the power source such as an engine (not shown).

The curved face (toroidal plane) of each discs 2 and 3 being opposed to each other function as the rolling face for transmitting the torque by the rotation of the power roller 4, and a mechanism for cooling the rolling face with drawing the heat generated from the transmission of the torque is provided thereon. The mechanism is depicted typically in FIG. 1. Namely, the portion of the inner circumferential side of each discs 2 and 3 are formed into cylindrical shape to be fit with the output shaft 5 and doubled as boss portions 2A and 3A. The outer circumferential face of the boss portions 2A and 3A are leading to the rolling faces 2B and 3B of the discs 2 and 3, and become part of the toroidal face. Moreover, oiling holes 2C and 3C which penetrate in the radial direction are formed on the boss portions 2A and 3A.

Figure 1:
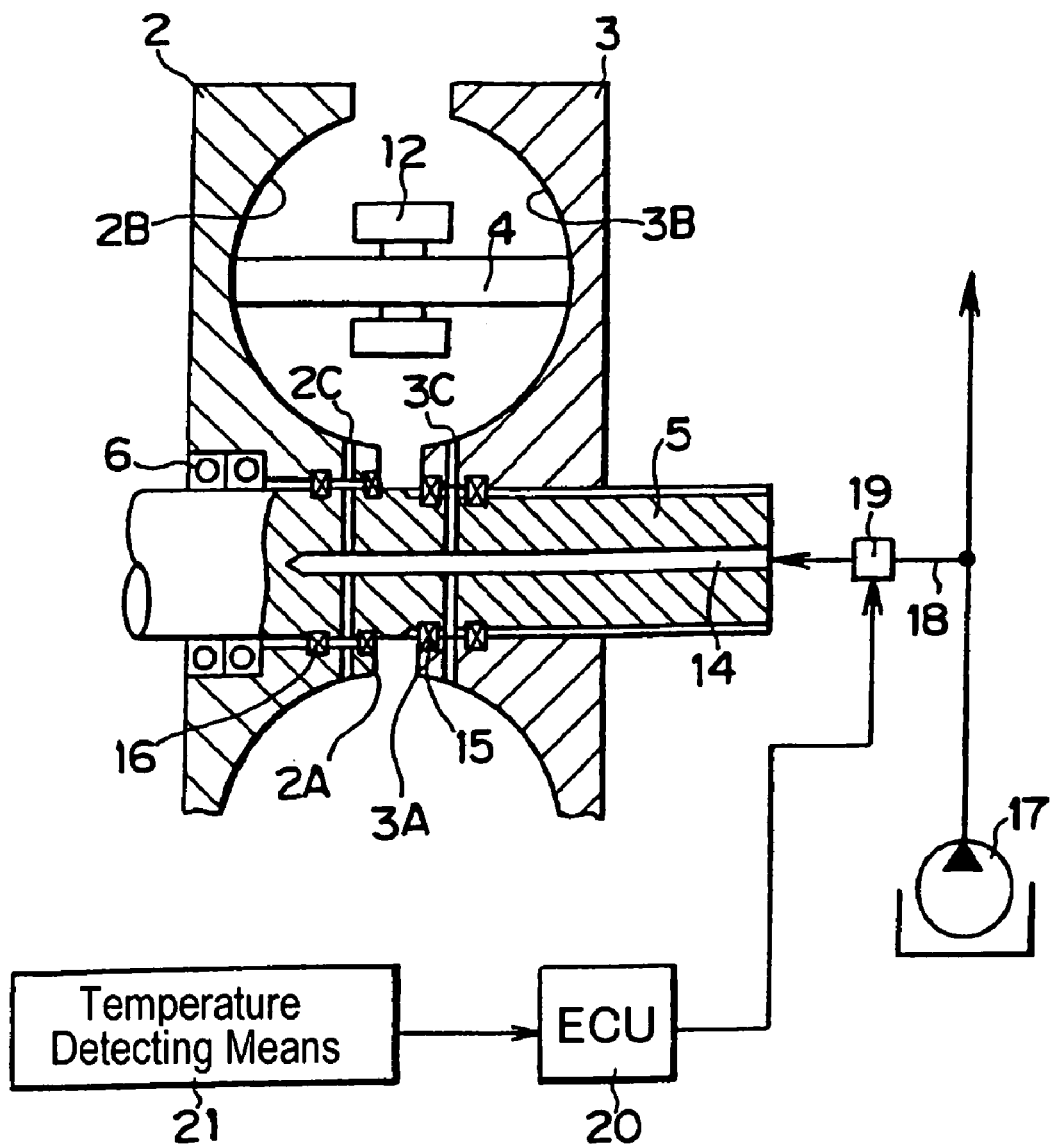
FIG. 1 is a schematic diagram showing one example of the present invention.

On the other hand, an oil passage 14 is formed in the output shaft 5 along its axial direction. The oil passage 14 diverges to the outside in the radial direction at the position where the discs 2 and 3 are fitted, and opens to the outer circumferential face of the output shaft 5, as shown in FIG. 1. The opening positions are opposed to opening ends of the inner circumferential side of the oiling holes 2C and 3C in each discs 2 and 3. Accordingly, each oiling hole 2C and 3C is communicated with the oil passage 14. Besides, in order to prevent a leakage of the lubricating oil with defilading communicating portion between those oiling holes 2C, 3C and the oil passage 14 from outside, sealing members 15 and 16 are arranged on both sides in the axial direction across the opening portions of oiling holes 2C and 3C to the oil passage 14. Those sealing members 15 and 16 contact with the outer circumferential face of the output shaft 5, and with the inner circumferential face of the discs 2 and 3, in order to maintain the liquid tight condition.

A hydraulic feeding source 17 such as a hydraulic pump or the like is connected to the oil passage 14. And a solenoid valve 19, which is capable of controlling the flow rate of the lubricating oil electrically is interposed on a pipeline 18 leading to the oil passage 14 in the output shaft 5 from the hydraulic feeding source 17. There is provided an electric control unit (ECU) 20 for controlling the solenoid valve 19. The electronic control unit 20 is constructed mainly of a microcomputer, in order to obtain the flow rate of the lubricating oil by calculation based on the inputted data, and the data and the program stored in advance, and to control the solenoid valve 19 to have the amount of the lubricating oil to be fed to the oil passage 14 correspond to the calculated rate.

Signal from a temperature detecting means 21 is imputed into the electronic control unit 20, as a data for the calculation to obtain the flow rate. The temperature detecting means 21 is a means for detecting temperatures of rolling faces 2B and 3B of the discs 2 and 3. In this connection, a means for obtaining the temperature by calculation may also be employed instead of the means for detecting the temperatures of the rolling faces 2B and 3B directly. For example, a means for calculating the temperatures of the rolling faces 2B and 3B based on detected temperature, with detecting the temperature of the lubricating oil which returns to an oil pan (not shown) such as an oil reservoir or the like; or a means for calculating temperatures of the rolling faces 2B and 3B based on the heat energy and heat release, or heat capacity of the continuously variable transmission 1 or the like, by calculating the energy inputted to the continuously variable transmission 1 based on the revolutions or the air suction amount of the engine as a power source, and calculating the output energy of the continuously variable transmission 1 based on the revolutions or the output torque of the output shaft 5, then, obtaining the energy converted to the heat by the continuously variable transmission 1 in accordance with the difference between those input energy and the output energy; are may also be employed.

In the aforementioned continuously variable transmission 1, the torque is transmitted to the input disc 2 by means of rotating an input gear 13 by a not shown power source such as an engine or the like, through a gear 8 engaged with the input gear 13 and the input shaft 7. When the input disc 2 rotates, the power roller 4 contacting with the rolling face 2B through the oil film is rotated, and the output disc 3 is rotated subsequently, because the power roller 4 contacts with the rolling face 3B of the output disc 3 through the oil film. Consequently, the output shaft 5 integrated with the output disc 3 is thereby rotated.

In such case, number of revolutions of the power roller 4 is determined depend on number of revolutions of the input disc 2, and the radius from the center of rotation at the contact portion against the rolling face 2B. Also, number of revolutions of the output disc 3 is determined depends on the number of revolutions of the power roller 4 and the radius from the center of rotation at the contact portion of the power roller 4 against the rolling face 3B. Accordingly, number of relative rotation of the output disc 3 against the input disc 2 is determined in connection with the radial positions of each contact portions of the power roller 4 against each rolling faces 2B and 3B, and speed change ratio is varied continuously by means of changing contacting portion of the power roller 4 against each rolling faces 2B and 3B, with inclining the power roller 4 against the center axis of the output shaft 5.

Transmission of the torque between each of said discs 2, 3 and the power roller 4 is executed through the shearing force of the oil film formed therebetween, and the lubricating oil for forming the oil film is fed to outer circumferential face of each discs 2 and 3 from the carriage 12. Also, the power roller 4 is clamped by the thrust force applied to the discs 2 and 3 in response to the torque to be transmitted. Accordingly, a strong compressive force and the shearing force act on the oil film, therefore, a heat is generated in connection with transmitting the torque. In order to prevent a temperature rise arise from the heat, the lubricating oil is fed to the rolling faces 2B and 3B from the oil passage 14 and the oiling holes 2C, 3C.

Figure 2:
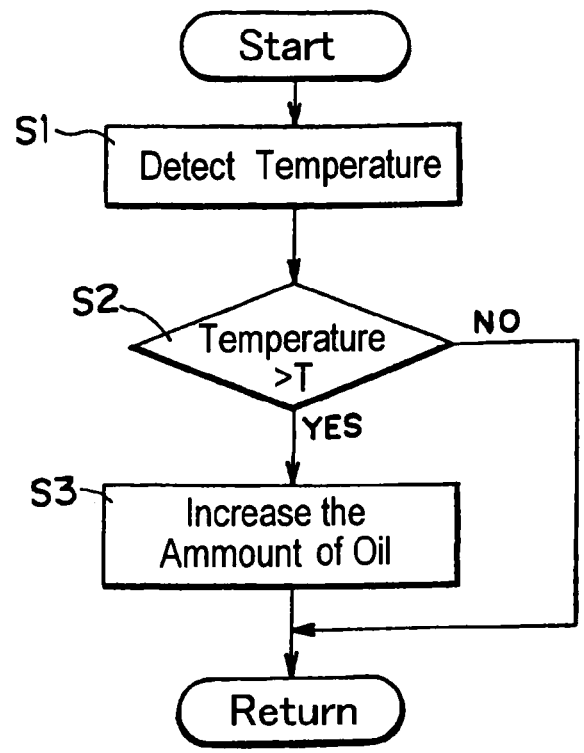
FIG. 2 is a flowchart describing an example of flow rate control of lubricating oil according to the present invention.

FIG. 2 describes an example to control the amount of the lubricating oil fed for mainly cooling purpose from the oiling holes 2C and 3C, and the temperature of the rolling faces 2B and 3B is detected first of all (Step S1). This detection of the temperature may be executed, for one example, by obtaining the amount of energy to be converted to the heat in the continuously variable transmission 1 from the difference between the input energy and the output energy, then, calculating based on the amount of heat. The detected temperature is decided whether higher than the criterion value T or not (step S2). The criterion value T is a value, which is determined in accordance with the upper limit of the temperature possible to transmit the torque among each discs 2, 3 and the power roller 4, or the value of the temperature lower than the upper limit. Otherwise, the value determined in accordance with the tempering temperature of the rolling faces 2B and 3B, or the value lower than the tempering temperature.

If the answer of Step S2 is NO for the reason that the detected temperature is lower than the criterion value T, the routine is returned. Accordingly, the amount of the lubricating oil is maintained as the feeding amount at that time. On the other hand, if the answer of Step S2 is YES for the reason that the detected temperature is higher than the criterion value T, feeding amount of the lubricating oil (oil amount) is increased (Step S3). Namely, a signal is outputted to the solenoid valve 19 from the electronic control unit 20, and the amount of the lubricating oil to be flown through the solenoid valve 19 is increased. The increasing amount may be determined in advance.

The lubricating oil fed to the oil passage 14 through the solenoid valve 19 is fed to the oiling holes 2C and 3C from the end portion opens to the outer circumferential face of the output shaft 5, and then, debouches to the side of rolling faces 2C and 3C from the oiling holes 2C and 3C. A centrifugal force acts on the lubricating oil because of the rotation of each disc 2 and 3. As a result, the lubricating oil debouches to the side of rolling faces 2C and 3C from the oiling holes 2C and 3C is flown by the centrifugal force along the rolling faces 2B and 3B in a radial direction outward. And when the discs 2 and 3 are rotating, the lubricating oil is scattered outward from the outer circumferential end of the discs 2 and 3 in the end. The lubricating oil thus flows with spreading on the surface of the rolling faces 2B and 3B draws the heat from the rolling faces 2B and 3B in the process, the rolling faces 2B and 3B are thereby cooled.

Besides, the routine shown in FIG. 2 is executed repeatedly at the predetermined interval, and the amount of the lubricating oil is increased again if the redetected temperature still exceeds the criterion value T. The amount of the lubricating oil is also increased if the answer of Step S2 is YES for the reason that the temperature detected at Step 1 is raised due to a change of driving condition of the power source, or a change of speed change ratio.

This kind of control for increasing the amount of the lubricating oil based on the temperature of the rolling faces 2B and 3B is executed continuously during the continuously variable transmission 1 is under operation. Accordingly, in order to change the speed change ratio, i.e., to execute speed change, the power roller 4 is occasionally inclined against the center axis of the output shaft 5. However, since the oiling holes 2C and 3C are formed on the portion corresponds to so-called boss portions 2A and 3A, where the power roller 4 is not to be contacted, there is no possibility of occurring of interference with the power roller 4, and breakage of power roller 4 and discs 2, 3 in connection with such interference.

According to the aforementioned continuously variable transmission 1, the lubricating oil is fed from the center side of the rotation of the discs 2 and 3, when the temperature rise of the discs 2 and 3 associated with the transmission of the torque is detected. Therefore, faulty transmission of the torque due to deterioration of viscosity or degeneration of the lubricating oil is avoided, and damnification of the rolling faces 2B and 3B due to breakage of oil film is also prevented. Moreover, if the criterion value T is set lower than the tempering temperature of the rolling faces 2B and 3B, surface hardness of the rolling faces 2B and 3B is maintained and the durability of those can be improved.

Additionally, the aforementioned continuously variable transmission 1 is constructed to feed the lubricating oil for cooling the rolling faces 2B and 3B of the discs 2 and 3 through the oil passage 14 formed in the output shaft 5 of the inner circumferential side of the discs 2 and 3, and through the oiling holes 2C and 3C. For constructing the oil passages as such, the general construction employed in the continuously variable transmission according to the prior art may be utilized. Therefore, lubrication and cooling of the continuously variable transmission 1 may be executed with simple structure.

Figure 3:
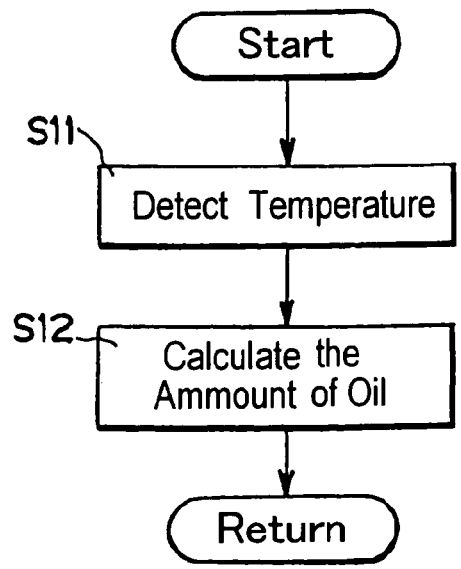
FIG. 3 is a flowchart describing another example of flow rate control of lubricating oil according to the present invention.

FIG. 3 is a flowchart describing another example to control the amount of the lubricating oil in the continuously variable transmission 1. The example described therein is the example of the construction to control the amount of the lubricating oil in accordance with the detected temperature. Namely, the temperature is detected first of all (Step S11). This may be executed likewise the Step S1 in the aforementioned example of the control shown in FIG. 2. Then, feeding amount of the lubricating oil (oil amount) is obtained based on the detected temperature (Step S12). The obtained oil amount is the amount not to let the temperatures of the rolling faces 2B and 3B be raised, and it may be obtained from an experimentation and mapped in advance. Accordingly, the oil amount may be obtained from the map at Step S12.

According to the example of control in FIG. 3, the amount of the lubricating oil is increased in accordance with the detected temperature when it rises, and the amount of the lubricating oil is decreased in accordance with the detected temperature when it falls. Therefore, temperature rise of the rolling faces 2B, 3B, and temperature rise of lubricating oil on the surface of the rolling faces 2B, 3B is prevented. In addition, overabundance of the feeding amount of the lubricating oil, and loss of motive energy associated with such overabundance is certainly prevented.

Here, the relation between the aforementioned example and the present invention will be described briefly hereinafter. The discs 2 and 3 correspond to the rotary member of the present invention, and the power roller 4 corresponds to the rolling member of the present invention. Also, the solenoid valve 19 and the device for executing Steps S2, S3 shown in FIG. 2, or Step S13 shown in FIG. 3 correspond to the adjuster of the present invention.

Besides, according to the full toroidal type continuously variable transmission 1 as shown in the aforementioned example, heat evolution resulted from the transmission of the torque is generated intensively at the contact portion between the power roller 4 and the discs 2, 3, in stead of that the thrust force is not generated on the power roller 4 in the direction of its center axis of the rotation. Accordingly, as mentioned above, transmission of the torque may be executed certainly by means of feeding the lubricating oil from the inner circumferential side of the rolling faces 2B and 3B with utilizing the centrifugal force, and breakage of the discs 2, 3 and the power roller 4 is also prevented certainly. On the other hand, in case of the half toroidal type continuously variable transmission, heat evolution on the rolling face is lower in comparison; however, the present invention may be applied to the half toroidal type continuously variable transmission without mentioning. Moreover, the construction is made to open the oiling hole to the rolling face in the above mentioned example; however, this invention should not be limited to the specific embodiment thus far described. It is not necessary for the opening portion of the oiling hole to be a part of the rolling face, the point is, it is sufficient for the oiling hole to open to the face leading to the rolling face in order to allow the lubricating oil flowing to the rolling face. Furthermore, according to the present invention, it is sufficient for the oil passage communicated with the oiling hole to be formed on the center side of the rotation of the discs, and also, the oil passage may be formed on the member other than the aforementioned output shaft. Additionally, in the above mentioned example, the construction is made to control the amount of the lubricating oil based on the temperature of the rolling member; however, this invention should not be limited to the above mentioned example, so that the construction may also be made to control the amount of the lubricating oil based on the surface temperature of the power roller. Still moreover, instead of interposing the valve for controlling the amount of the lubricating oil to be fed to the rolling member from the oiling hole at the pipeline communicating only with the oiling hole, the flow rate regulating valve can substitutes with being interposed at the pipeline communicating with the oil passage of the carriage.

Here will be synthetically described the advantages to be attained by this invention. According to the present invention, as has been described hereinbefore, because the lubricating oil is fed to the oiling hole from the oil passage provided on center side of the rotary member, and the lubricating oil is flown to the outer circumferential side of the rotary member by means of the centrifugal force generated from the rotation of the rotary member, the rolling face of the rotary member in which the transmission of the torque is generated can be cooled by means of the lubricating oil. Also, the structure may be simplified according to the present invention, because, it is sufficient for the oil passage of the center side of the rotary member to along the predetermined shaft in the axial direction and to open its end portion to the outer circumferential face of the shaft, and it is sufficient for the oiling hole to penetrate the end portion of the rotary member in a radial direction and to be communicated with the oil passage. Moreover, the oil passage may be elongated to the outside of the member to rotate such as the rotary member or the predetermined shaft; therefore, amount of the lubricating oil to be fed to the oil passage may be controlled easily by the ordinary controlling devices such as the closing valve or the flow control valve.

Also, according to the present invention, the rolling member contacts with the portion of the rolling face where the oiling hole is not formed, therefore, the oiling hole may not be a factor of concavity and convexity on the rolling face in which the rolling member is to be contacted. Accordingly, feeding of the lubricating oil to the rolling face may be executed certainly and easily without restricting the shape of the rolling face and the construction of the rotary member.

Moreover, according to the present invention, because the amount of the lubricating oil is regulated based on the temperature, the lubricating oil may be fed without excess and deficiency. Consequently, excessive rise of the temperature and unnecessary waste of the motive energy or the like is thereby prevented.

Furthermore, according to the present invention, the amount of the oil to be fed from the oiling hole is increased when the temperature at the rolling face of the rotary member, or temperature of the rolling member excesses the criterion value which is set in accordance with the tempering temperature of the rotary member. Therefore, the rolling face of the rotary member is cooled sufficiently, and tempering or sequential deteriorating may be avoided. Moreover, because the lubricating oil may not be fed excessively when the temperature is not especially high, unnecessary waste of the motive energy is accordingly avoided.

INDUSTRIAL APPLICABILITY

This invention can be utilized in the field for manufacturing the continuously variable transmission and in the field for using the continuously variable transmission. Especially, this invention can be utilized in the field relating to an automobile having the continuously variable transmission mounted thereon.

The invention claimed is:

1. A toroidal type continuously variable transmission wherein a rolling member for mediating the transmission of the torque is clamped between at least a pair of rotary members; and wherein a rolling face of rotary members being opposed to each other has a curved face, in which its sectional face along the plane including a center axis of rotation is shaped into an arc, in order to allow said rolling face of said rolling member inclining against said center axis of the rotation of said rotary member, characterized by comprising:
    an oiling hole formed on the portion on the center side of the rotation in said rolling face of the rotary members being opposed to each other, or on the portion on the center side of the rotation leading to said rolling face; and
    an oil passage for feeding the lubricating oil to said oiling hole, formed on the center side of the rotation in said rotary member, with being communicated with the oiling hole.

2. A toroidal type continuously variable transmission as set forth in claim 1, characterized:
    in that said oiling hole is formed on the portion of said rolling face where the rolling member is not contacted.

3. A toroidal type continuously variable transmission as set forth in claim 1, characterized:
    in that said rotary member has a boss portion leading to said rolling face on the center side of the rotation; and
    in that said oiling hole is formed on at least any of, the portion of said rolling face where said rolling member is not contacted, or said boss portion.

4. A toroidal type continuously variable transmission as set forth in claim 1, characterized by further comprising:
    a temperature detector for detecting any of, a temperature of the rolling face of the rotary member, or a temperature of the rolling member; and
    a regulator for regulating amount of the oil to be fed to the rolling face from the oiling hole based on the temperature detected by the temperature detector.

5. A toroidal type continuously variable transmission as set forth in claim 4, characterized:
    in that said temperature detector includes a device for detecting said temperature rise based on any of, the temperature of said rolling face, the temperature of the lubricating oil for lubricating said rolling face, or the difference between an input energy and an output energy of said continuously variable transmission.

6. A toroidal type continuously variable transmission as set forth in claim 4, characterized:
in that said regulator includes a device for increasing the amount of the oil to be fed to said rolling face from said oiling hole, in case that the temperature detected by said temperature detector excesses a criterion value which is set based on tempering temperature of said rotary member.

7. A full toroidal type continuously variable transmission wherein a rolling member for mediating the transmission of the torque is clamped between at least a pair of rotary members; and wherein a rolling face of rotary members being opposed to each other has a curved face, in which its sectional face along the plane including a center axis of rotation is shaped into an arc, in order to allow said rolling face of said rolling member inclining against the said center axis of the rotation of said rotary member, characterized by comprising:
an oiling hole formed on the portion on the center side of the rotation in said rolling face of the rotary members being opposed to each other, or on the portion on the center side of the rotation leading to said rolling face; and
an oil passage for feeding the lubricating oil to said oiling hole, formed on the center side of the rotation in said rotary member, with being communicated with the oiling hole.

8. A full toroidal type continuously variable transmission according to claim 7, characterized:
in that said oiling hole is formed on the portion of said rolling face where the rolling member is not contacted.

9. A full toroidal type continuously variable transmission according to claim 7, characterized:
in that said rotary member has a boss portion leading to said rolling face on the center side of the rotation; and
in that said oiling hole is formed on at least any of, the portion of the rolling face where the rolling member is not contacted, or said boss portion.

10. A toroidal type continuously variable transmission as set forth in claim 2, characterized by further comprising:
a temperature detector for detecting any of, a temperature of the rolling face of the rotary member, or a temperature of the rolling member; and
a regulator for regulating amount of the oil to be fed to the rolling face from the oiling hole based on the temperature detected by the temperature detector.

11. A toroidal type continuously variable transmission as set forth in claim 3, characterized by further comprising:
a temperature detector for detecting any of, a temperature of the rolling face of the rotary member, or a temperature of the rolling member; and
a regulator for regulating amount of the oil to be fed to the rolling face from the oiling hole based on the temperature detected by the temperature detector.

* * * * *